(12) United States Patent
Saito et al.

(10) Patent No.: US 10,279,845 B2
(45) Date of Patent: May 7, 2019

(54) VEHICLE REAR BODY STRUCTURE

(71) Applicant: HONDA MOTOR CO., LTD., Tokyo (JP)

(72) Inventors: Satoshi Saito, Saitama (JP); Yuki Matsubara, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 17 days.

(21) Appl. No.: 15/580,508

(22) PCT Filed: Apr. 18, 2016

(86) PCT No.: PCT/JP2016/062283
§ 371 (c)(1),
(2) Date: Dec. 7, 2017

(87) PCT Pub. No.: WO2016/199500
PCT Pub. Date: Dec. 15, 2016

(65) Prior Publication Data
US 2018/0178849 A1 Jun. 28, 2018

(30) Foreign Application Priority Data
Jun. 8, 2015 (JP) .................................. 2015-115810

(51) Int. Cl.
*B62D 25/04* (2006.01)
*B62D 25/08* (2006.01)

(52) U.S. Cl.
CPC ........... *B62D 25/088* (2013.01); *B62D 25/04* (2013.01); *B62D 25/087* (2013.01)

(58) Field of Classification Search
CPC ..... B62D 25/04; B62D 25/087; B62D 25/088
See application file for complete search history.

(56) References Cited

U.S. PATENT DOCUMENTS

2004/0232647 A1  11/2004  Kim
2008/0007093 A1*  1/2008  Andou ................... B62D 25/04
                                                              296/193.08
(Continued)

FOREIGN PATENT DOCUMENTS

CN  101209719 A  7/2008
CN  101585375 A  11/2009
(Continued)

OTHER PUBLICATIONS

Jul. 12, 2016, International Search Report issued for related International application No. PCT/JP2016/062283.
(Continued)

*Primary Examiner* — Gregory A Blankenship
(74) *Attorney, Agent, or Firm* — Paratus Law Group, PLLC (57) ABSTRACT

A vehicle rear body structure includes left and right rear pillars extending forward and upward from rear lower ends of left and right rear side frames, left and right rear wheel houses provided between the left and right rear side frames and the left and right rear pillars, and left and right damper bases provided at upper parts inside the left and right rear wheel houses. Left and right spaces between left and right top plates of the left and right rear wheel houses and the left and right rear pillars are closed by left and right gussets. The left and right rear pillars, the upper parts of the left and right rear wheel houses, and the left and right gussets are combined in closed cross-sections. The left and right damper bases are surrounded by the left and right gussets through the left and right rear wheel houses.

6 Claims, 11 Drawing Sheets

(56) References Cited

U.S. PATENT DOCUMENTS

| | | | |
|---|---|---|---|
| 2008/0007095 A1* | 1/2008 | Wolkersdorfer | B62D 25/02 |
| | | | 296/203.04 |
| 2009/0289475 A1 | 11/2009 | Walter et al. | |
| 2010/0133879 A1 | 6/2010 | Leonetti et al. | |
| 2011/0156447 A1* | 6/2011 | Matsuoka | B62D 25/087 |
| | | | 296/203.04 |
| 2013/0169006 A1* | 7/2013 | Sera | B62D 25/087 |
| | | | 296/203.04 |
| 2014/0159433 A1 | 6/2014 | Katou et al. | |
| 2015/0251703 A1 | 9/2015 | Yamada et al. | |
| 2017/0197665 A1* | 7/2017 | Kabayama | B62D 25/087 |
| 2018/0178849 A1* | 6/2018 | Saito | B62D 25/04 |
| 2018/0297642 A1* | 10/2018 | Kudoh | B62D 25/087 |

FOREIGN PATENT DOCUMENTS

| | | |
|---|---|---|
| CN | 201660027 U | 12/2010 |
| CN | 202225924 U | 5/2012 |
| CN | 203439131 U | 2/2014 |
| CN | 103717481 A | 4/2014 |
| JP | 2004-345624 A | 12/2004 |
| JP | 2008-062748 A | 3/2008 |
| JP | 2011-136623 A | 7/2011 |
| JP | 2011-143882 A | 7/2011 |
| JP | 2013-082372 A | 5/2013 |
| JP | 5377047 B2 | 12/2013 |
| JP | 2014-046840 A | 3/2014 |

OTHER PUBLICATIONS

Jul. 12, 2016, International Search Opinion issued for related International application No. PCT/JP2016/062283.

Jan. 22, 2019, Chinese Office Action issued for related CN Application No. 201680033333.1.

* cited by examiner

VEHICLE REAR BODY STRUCTURE

CROSS REFERENCE TO PRIOR APPLICATION

This application is a National Stage Patent Application of PCT International Patent Application No. PCT/JP2016/062283 (filed on Apr. 18, 2016) under 35 U.S.C. § 371, which claims priority to Japanese Patent Application No. 2015-115810 (filed on Jun. 8, 2015), which are all hereby incorporated by reference in their entirety.

TECHNICAL FIELD

The present invention relates to a technique for providing an improved vehicle rear body structure.

BACKGROUND ART

Left and right damper bases are provided on a rear of a vehicle body to support upper parts of dampers of left and right rear suspensions. An external force acting in a push-up direction from a road surface, that is, a road surface reaction force is transmitted from the left and right dampers to the left and right damper bases. On the other hand, the development of a technique to increase rigidity of the rear of the vehicle body has been advanced. A vehicle rear body structure having such a configuration is known in Patent Literature 1, for example.

The vehicle rear body structure known in Patent Literature 1 has a configuration in which left and right damper bases are provide on upper ends of left and right rear wheel houses. Left and right rear pillars extending upward are provided at outer sides of the left and right damper bases in a vehicle width direction. Left and right roof side rails extending in the front-and-rear direction of the vehicle body are provided at the upper ends of the left and right rear pillars. The left and right roof side rails support a roof.

The left rear pillar is reinforced by a left gusset and a left stiffener. The left gusset is stretched between the left damper base and the left roof side rail and is provided on an inner surface of the left rear pillar in the vehicle width direction. The left stiffener is provided inside the left rear pillar. As a result, the left rear pillar can be prevented from falling down in the vehicle width direction. The same configuration is also applied to the right rear pillar.

In Patent Literature 1, however, as described above, the left and right rear pillars are provided at the outer sides the left and right damper bases in the vehicle width direction. That is, the left and right rear pillars are offset in the vehicle width direction from the center of the left and right damper base to which the damper is attached. For this reason, when the external force acting in the push-up direction from the road surface, that is, the road surface reaction force is transmitted from the left and right suspension dampers to the left and right damper bases, a bending moment in the vehicle width direction may be generated in the left and right rear pillars. This is disadvantageous for suppressing generation of road noise, and there is room for further improvement. On the other hand, it is considered that a separate reinforcing member is additionally provided from the left and right damper bases to the left and right rear pillars. However, when the reinforcing member is additionally provided to increase rigidity against the bending moment, it is not advisable because the weight of the vehicle body increases.

PRIOR ART LITERATURE

Patent Literature

Patent Literature 1: JP-B-5377047

SUMMARY OF THE INVENTION

Problem that the Invention is to Solve

An object of the present invention is to provide a technique capable of enhancing the overall rigidity in a vertical direction from upper parts of left and right damper bases and left and right rear wheel houses to left and right rear pillars.

Means for Solving the Problem

The present invention is to provide a vehicle rear body structure including:
left and right rear side frames that are positioned at a rear of a vehicle body and extend in a front-and-rear direction of the vehicle body;
left and right rear pillars that extend forward and upward from rear lower ends of the left and right rear side frames;
left and right rear wheel houses that are positioned between the left and right rear side frames and the left and right rear pillars and are recessed inward in a vehicle width direction; and
left and right damper bases that are provided on upper parts of the left and right rear wheel houses, wherein
lower ends of the left and right rear wheel houses are joined to the left and right rear side frames,
left and right top plates of the left and right rear wheel houses are positioned immediately below the left and right rear pillars,
the left and right rear pillars are joined to outer sides in the vehicle width direction of the upper ends of the left and right rear wheel houses,
left and right spaces provided between the left and right top plates and the left and right rear pillars are closed by left and right gussets that have substantially U-shaped cross sections in a plan view and that have openings on outside in the vehicle width direction,
lower ends of the left and right gussets are joined to the left and right rear wheel houses and upper ends of the left and right gussets are joined to the left and right rear pillars, so that the left and right rear pillars, the upper parts of the left and right rear wheel houses, and the left and right gussets are configured to be combined in closed cross-sections in a side view, and
the left and right damper bases are positioned inside the left and right rear wheel houses and are surrounded by the left and right gussets through the left and right rear wheel houses.

Thus, the left and right damper bases provided in the inner portions and the upper parts of the left and right rear wheel houses are surrounded by the left and right gussets through the left and right rear wheel houses. The upper parts of the left and right rear wheel houses, the left and right rear pillars, and the left and right gussets are combined in closed cross-sections in a side view in the vertical direction of the vehicle body. Therefore, the rigidity of the entire region in the vertical direction ranging from the left and right damper bases and the upper parts of the left and right rear wheel houses to the left and right rear pillars can be improved.

An external force that is applied in a push-up direction from a road surface, that is, a road surface reaction force is transmitted the dampers of left and right suspensions to the left and right damper bases. On the other hand, the left and right damper bases and the upper parts of the left and right rear wheel houses are sufficiently supported by the left and right rear pillars through the left and right gussets. Therefore, the stress of the left and right damper bases and the upper parts of the left and right rear wheel houses generated by the road surface reaction force (damper input load) can be effectively reduced. Further, in order to improve the rigidity of the coupled structure, it is not necessary to add another reinforcing member. Therefore, the weight of the vehicle body can be suppressed as much as possible.

Preferably, left and right braces are coupled by bolts in respective corners in front-and-rear direction of the vehicle body between inner surfaces of the left and right rear pillars in the vehicle width direction and inner surfaces of the left and right gussets in the vehicle width direction. The left and right braces can function to brace the respective corners between the left and right rear pillars and the left and right gussets. That is, the inner surfaces of the left and right rear pillars in the vehicle width direction, the inner surfaces of the left and right gussets in the vehicle width direction, and the left and right braces are combined to form a truss structure. Therefore, the bending moment generated from the left and right rear pillars can be converted into a compressive load and can be effectively transmitted to the left and right gussets.

Preferably, brittle portions are respectively provided in parts of the left and right braces in a longitudinal direction. For this reason, in a case where an impact force is generated from the rear side in a rear end of the vehicle, that is, in a case where a rear collision occurs in the vehicle, the left and right brittle portions are plastically deformed such that they can absorb the collision energy.

Preferably, a roof arch is stretched between front upper ends of the left and right rear pillars to support a roof. Left and right corners are formed in recessed arc shapes between inner surfaces of the front upper ends of the left and right rear pillars in the vehicle width direction and a rear surface of the roof arch, when the vehicle body is seen from the above. Lower edges of the left and right corners are formed in a continuous square cross-sectional shape. Front edges and rear edges of the left and right gussets positioned inside in the vehicle width direction are respectively formed in a square cross-sectional shape. Left and right stiffeners are positioned in the left and right corners. The left and right stiffeners are formed in substantially L-shaped cross sections such that the left and right stiffeners can overlap with and be joined to both the lower edges of the left and right corners and either the left and right front edges of the left and right gussets or the left and right rear edges of the left and right gussets.

For this reason, the rotation displacement of the left and right gussets about a center axis of the left and right gussets in the vertical direction can be suppressed. Accordingly, the NV (noise vibration) performance of the vehicle body in a state where an engine idles, that is, the so-called idle NV performance can be improved. As a result, in a state where the engine idles and the vehicle is stopped, vibration (idling vibration) transmitted from the engine to the vehicle interior and felt by a passenger can be reduced.

Preferably, left and right bulkheads are provided inside the left and right rear pillars. The left and right bulkheads are positioned at upper ends of edges of the left and right gussets on a side of the roof arch or in a vicinity of the upper ends. Thus, the rigidity of intersections between the left and right rear pillars and the left and right gussets can be improved by the left and right bulkheads. As a result, the idle NV performance of the vehicle body can be improved. In addition, by providing the left and right bulkheads, the rigidity of joints between moving portions during idling vibration can be improved, and the vibration can be reduced.

Preferably, the left and right damper bases are configured by members other than the left and right rear wheel houses, and are positioned in recess portions of the left and right rear wheel houses that are recessed inward in the vehicle width direction. The left and right rear wheel houses and the left and right damper bases are combined in box shapes. For this reason, the rigidity of the combination portion of the left and right rear wheel houses and the left and right damper bases, that is, the rigidity of the portion supporting the left and right dampers can be further improved. Accordingly, the thicknesses of the left and right rear wheel houses can be reduced, and thus even in a case where the weight of the vehicle body is reduced, the rigidity of the portion supporting the left and right dampers can be secured.

Preferably, the left and right damper bases are joined to the lower ends of the left and right gussets through the left and right rear wheel houses. For this reason, the damper input load transmitted from the left and right dampers to the left and right damper bases can be sufficiently supported by the left and right rear side frames and the left and right rear pillars through the left and right rear wheel houses and the left and right gussets.

Preferably, the left and right damper bases includes: substantially flat left and right damper attachment boards to which upper ends of the left and right dampers are attached: and left and right bulkheads that are provided in the left and right attachment boards. The left and right damper attachment boards are positioned with a space below inner surfaces of top plates of the left and right rear wheel houses. The left and right bulkheads are positioned in fastening portions for fastening the upper ends of the left and right dampers in the left and right damper attachment boards or in a vicinity of the fastening portion, and extend from the left and right damper attachment boards to inner surfaces of the left and right top plates. Left and right closed spaces surrounded by the left and right rear wheel houses and the left and right damper bases are partitioned by the left and right bulkheads in the front-and-rear direction of the vehicle body.

Therefore, due to the left and right bulkheads, the rigidity of the left and right attachment boards in a board surface direction (vertical direction of the vehicle body) can be further improved. Accordingly, the left and right attachment boards can sufficiently support the damper input load transmitted to the left and right dampers.

Preferably, the left and right rear wheel houses are reinforced by left and right front reinforcing members and left and right rear reinforcing members that extend upward from the left and right rear side frames. The left and right front reinforcing members are continuous to front edges of the left and right gussets positioned inside in the vehicle width direction. The left and right rear reinforcing members are continuous to rear edges of the left and right gussets positioned inside the vehicle width direction. Therefore, the damper input load transmitted from the left and right dampers to the left and right damper bases can be sufficiently supported by the left and right rear side frames through the left and right rear wheel houses, the left and right gussets, and the front and rear reinforcing members.

Advantage of the Invention

According to the present invention, it is possible to enhance the overall rigidity in the vertical direction from the upper parts of the left and right damper bases and the left and right rear wheel houses to the left and right rear pillars.

MODE FOR CARRYING OUT THE INVENTION

An embodiment for carrying out the invention will be described below with reference to the accompanying drawings.

[Embodiment]

A vehicle rear body structure according to an embodiment will be described based on the drawings. The terms "front", "rear", "right", "left", "above" and "below" represent respective directions as viewed from a driver. Reference characters "Fr", "Rr". "Le", and "Ri" respectively represent a front side, a rear side, a left side, and a right side.

Figure 1:
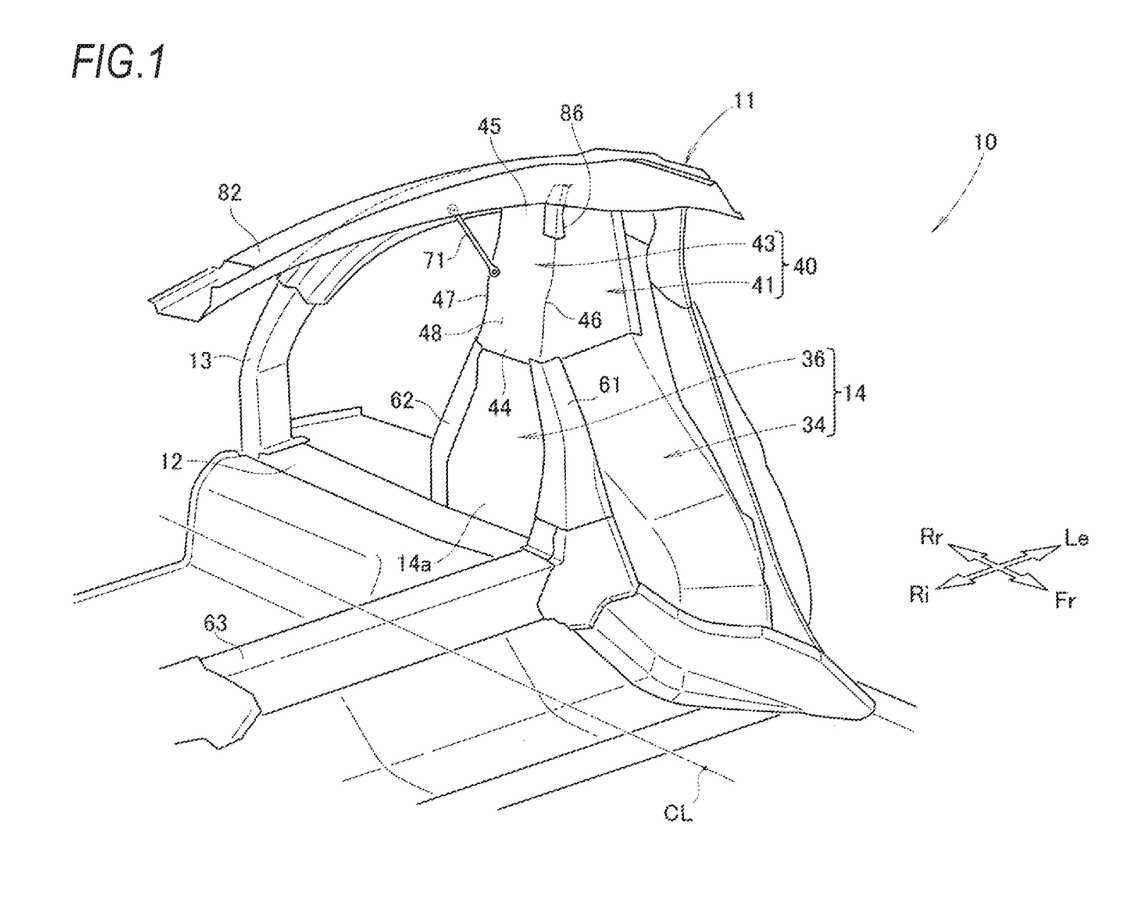
FIG. 1 is a perspective view of a left half of a vehicle rear body according to the present invention as seen from a front side in an interior of a vehicle.

As illustrated in FIG. 1, a vehicle body 11 of a vehicle 10 such as a passenger car is a monocoque body, and is formed substantially to be bilaterally symmetrical with respect to a vehicle-width centerline CL extending in a front-and-rear direction of the vehicle and passing through a center in a vehicle width direction of the vehicle 10. In the following description, for this reason, only a left half of a vehicle rear body is illustrated and only the left half of the vehicle rear body will mainly be described. A right half of the vehicle rear body has substantially the same configuration as the left half except for being bilaterally symmetrical with respect to the left half, so that the drawing is omitted and the description thereof will not be appropriately presented.

Figure 2:
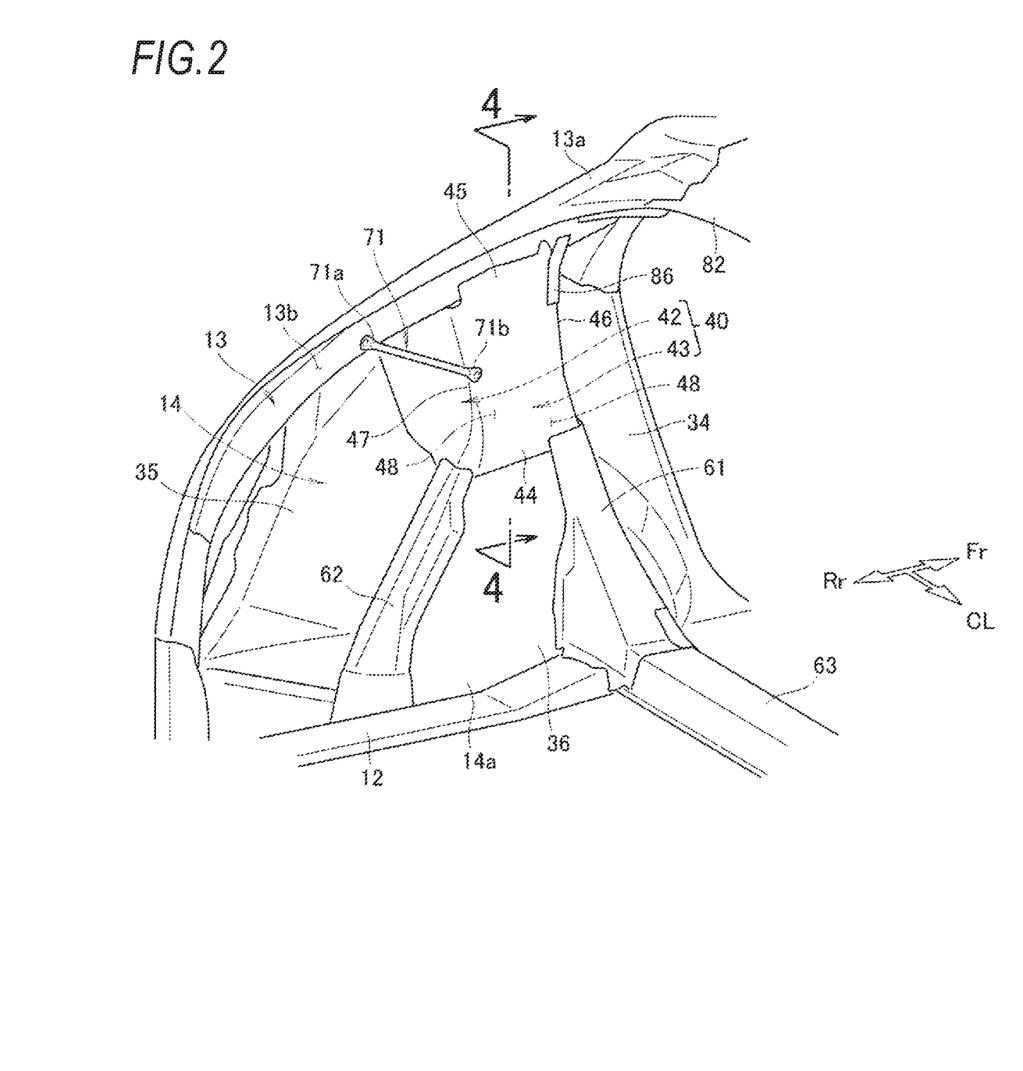
FIG. 2 is a perspective view of the left half of the vehicle rear body illustrated in FIG. 1 as seen from a rear side in the interior of the vehicle.

As illustrated in FIGS. 1 and 2, the vehicle body 11 includes left and right rear side frames 12 (illustrating only the left side: the same applies hereafter), left and right rear pillars 13, and left and right rear wheel houses 14 at a lower part of a rear half portion.

The left and right rear side frames 12 are positioned at a rear of the vehicle body 11 and extend in a front-and-rear direction of the vehicle body. The left and right rear pillars 13 extend while inclining forward and upward from rear lower ends of the left and right rear side frames 12, respectively. The left and right rear wheel houses 14 are positioned between the left and right rear side frames 12 and the left and right rear pillars 13. Lower ends 14a of the left and right rear wheel houses 14 are joined to the left and right rear side frames 12.

Figure 3:
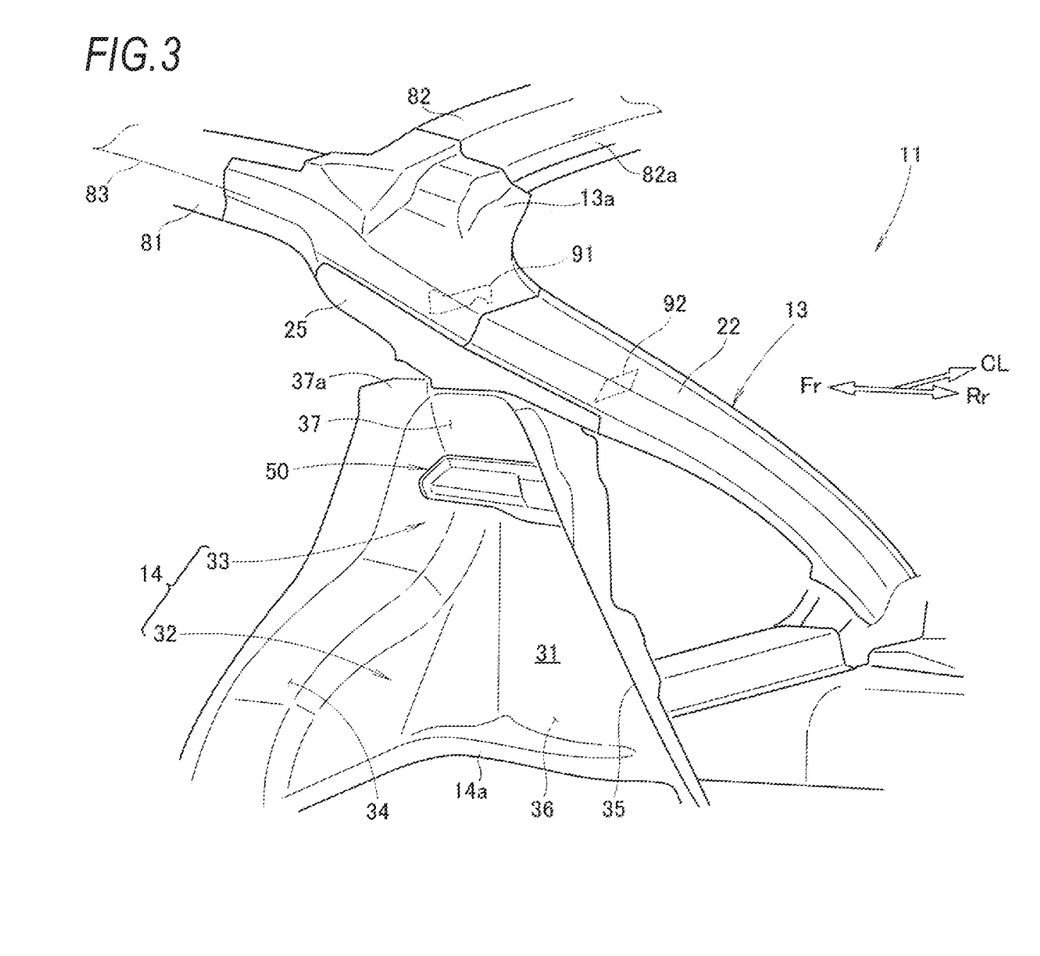
FIG. 3 is a perspective view of the left half of the vehicle rear body illustrated in FIG. 2 as seen from the outer side in a vehicle width direction.
Figure 4:
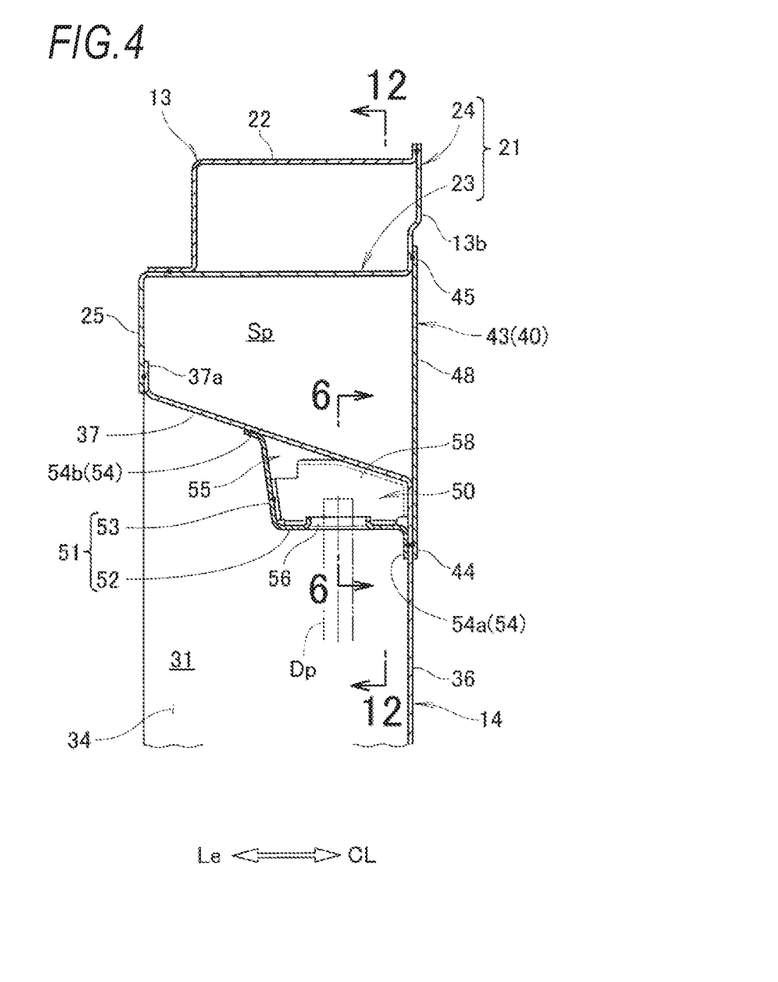
FIG. 4 is a sectional view taken along line 4-4 in FIG. 2.

Next, the left and right rear pillars 13 will be described in detail. As illustrated in FIGS. 3 and 4, the left and right rear pillars 13 are formed in a substantially rectangular closed cross-section by left and right pillar inner panels 21 positioned inside in the vehicle width direction and left and right pillar outer panels 22 positioned outward in the vehicle width direction. The left and right pillar inner panels 21 and the left and right pillar outer panels 22 are press-formed plates.

The left and right pillar inner panels 21 are members having a L-shaped cross section when seen from the rear side, and include horizontal plates 23 that have a substantially flat plate shape and vertical plates 24 that vertically extend from inner ends of the horizontal plates 23 in the vehicle width direction. The left and right pillar outer panels 22 are formed to have substantially inverted L-shape cross sections with respect to the left and right pillar inner panels 21. In outer ends of the horizontal plate 23 in the vehicle width direction, left and right brackets 25 that extend downward and have a vertical plate shape are integrally formed. The left and right brackets 25 may be configured to be adjacent to the horizontal plates 23.

Next, the left and right rear wheel houses 14 will be described in detail. As illustrated in FIGS. 3 and 4, the left and right rear wheel houses 14 are recessed inward in the vehicle width direction. More specifically, the left and right rear wheel houses 14 are press-formed plates and are formed to have substantially U-shaped cross sections in a plan view that have openings on the outside in the vehicle width direction. As a result, in the left and right rear wheel houses 14, left and right recess portions 31 that are recessed inward in the vehicle width direction are formed.

The left and right rear wheel houses 14 include: left and right lower half portions 32 that can accommodate at least upper halves of left and right rear wheels (not illustrated), and left and right upper half portions 33 that are continuously positioned over the left and right lower half portions 32 and can accommodate upper half portions of left and right dampers (not illustrated). When the left and right rear wheel houses 14 are seen from the vehicle width direction, the widths of the left and right upper half portions 33 are less than the widths of the left and right lower half portions 32.

The left and right rear wheel houses 14 include: arc-shaped front plates 34 that are formed substantially along outer circumferential surfaces of the rear wheels (not illustrated); rear plates 35 that are positioned in rear of the front plates 34; left and right back plates 36 having a vertical plate shape that are positioned inside in the vehicle width direction; and left and right top plates 37 that are positioned on the upper side. The left and right rear wheel houses 14 form the left and right recess portions 31.

The left and right top plates 37 (upper plates 37) are portions having a substantially flat plate shape that surround upper ends of the left and right upper half portions 33, and are inclined upward from upper ends of the left and right back plates 36 to the outside in the vehicle width direction. In the upper ends (left and right top plates 37) of the left and right rear wheel houses 14, outer portions in the vehicle width direction, that is, outer ends in the vehicle width direction have left and right flanges 37a that extend upward from the outer ends.

The left and right top plates 37 are positioned at a distance immediately below the left and right rear pillars 13. Left and right spaces Sp are provided immediately below the left and right rear pillars 13. The left and right spaces Sp are positioned between the left and right top plates 37 and the left and right rear pillars 13.

In the upper ends of the left and right rear wheel houses 14, outer portions in the vehicle width direction, that is, outer edges of the left and right top plates 37 in the vehicle width direction are joined to the left and right rear pillars 13. More specifically, in the outer edges of the left and right top plates 37 in the vehicle width direction, the left and right flanges 37a are formed. The left and right flanges 37a are joined to the left and right brackets 25. As a result, the upper ends of the left and right rear wheel houses 14 are joined to the left and right rear pillars 13. Even in a configuration where the left and right flanges 37a are directly joined to the horizontal plates 23 of the left and right pillar inner panels 21, the upper ends of the left and right rear wheel houses 14 can be joined to the left and right rear pillars 13.

Figure 5:
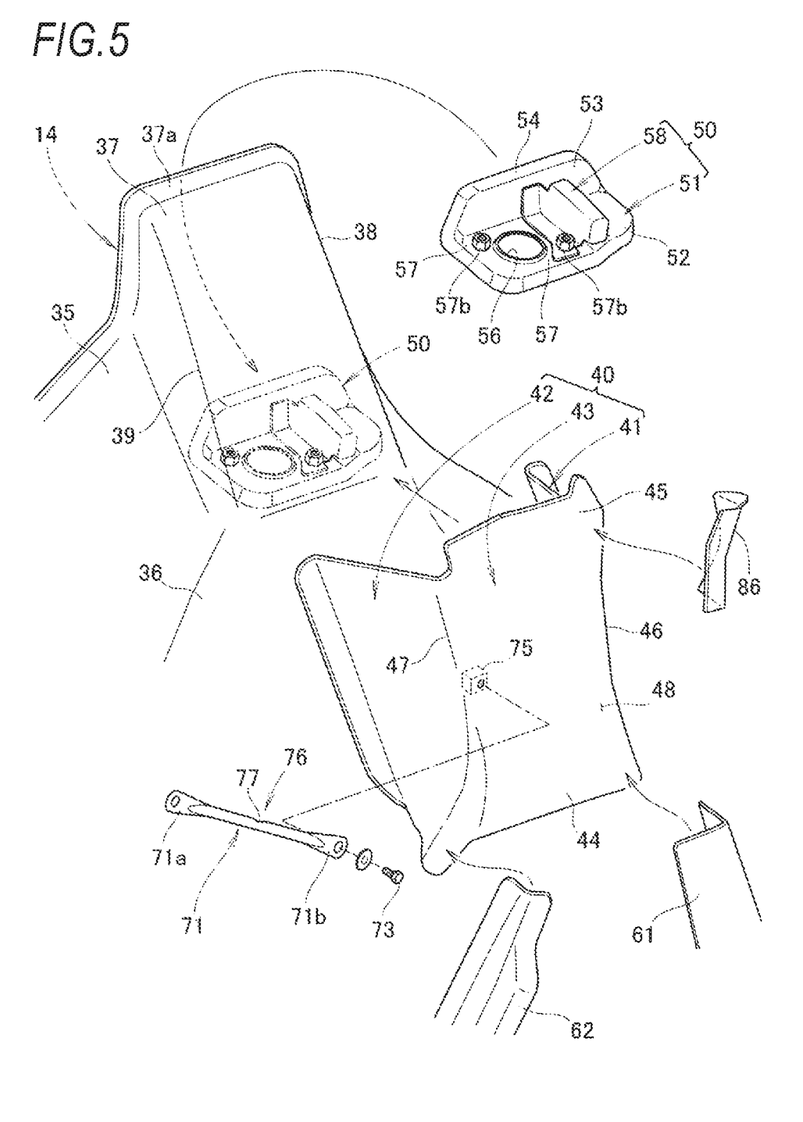
FIG. 5 is an exploded view of a left rear % heel house, a left gusset, a left brace, left front and rear reinforcing members, and a left stiffener illustrated in FIG. 2.
Figure 6:
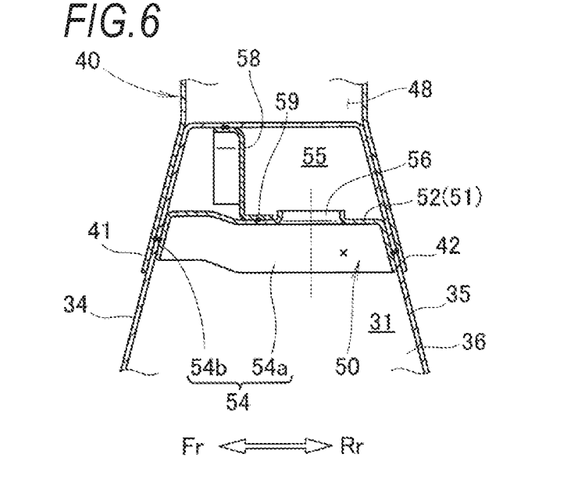
FIG. 6 is a sectional view taken along line 6-6 in FIG. 4.

As illustrated in FIGS. 4 to 6, the left and right spaces Sp are closed by left and right gussets 40 having a substantially U-shaped cross section in a plan view that have openings on the outside in the vehicle width direction.

The left and right gussets 40 are press-formed plates and include front plates 41, rear plates 42, and back plates 43, respectively. The front plates 41 are vertical plates that overlap with and are joined to outer surfaces of the front plates 34 of the left and right rear wheel houses 14. The rear plates 42 are vertical plates that overlap with and are joined to outer surfaces of the rear plates 35 of the left and right rear wheel houses 14. The back plates 43 are vertical plates that overlap with and are joined to outer surfaces of the back plates 36 of the left and right rear wheel houses 14.

Lower ends 44 of the left and right gussets 40 are joined to the left and right rear wheel houses 14. Upper ends 45 of the left and right gussets 40 are joined to the left and right rear pillars 13. As a result, the left and right rear pillars 13, upper parts of the left and right rear wheel houses 14, and the left and right gussets 40 are configured to be combined in a closed cross-section in a side view.

As illustrated in FIGS. 4 to 6, left and right damper bases 50 are provided in upper parts of the recess portions 31 of the left and right rear wheel houses 14. The left and right damper bases 50 are members to which upper ends of left and right dampers Dp illustrated in an imaginary line of FIG. 4 can be attached, and are positioned in the left and right upper half portions 33 (see FIG. 3) in the left and right rear wheel houses 14, that is, in the left and right recess portions 31.

More specifically, the left and right damper bases 50 are configured by members other than the left and right rear wheel houses 14, and are positioned in the recess portions 31 of the left and right rear wheel houses 14 that are recessed inside in the vehicle width direction. The left and right rear wheel houses 14 and the left and right damper bases 50 are combined in a box shape. Therefore, the rigidity of the combination portion of the left and right rear wheel houses 14 and the left and right damper bases 50, that is, the rigidity of the portion supporting the left and right dampers Dp can be further improved. Accordingly, the thicknesses of the left and right rear wheel houses 14 can be reduced, and thus even in a case where the weight of the vehicle body is reduced, the rigidity of the portion supporting the left and right dampers Dp can be secured.

Thus, the left and right damper bases 50 provided in the inner portions and the upper parts of the left and right rear wheel houses 14 are surrounded by the left and right gussets 40 through the left and right rear wheel houses 14. The upper parts of the left and right rear wheel houses 14, the left and right rear pillars 13, and the left and right gussets 40 are combined in a closed cross-section in a side view in the vertical direction of the vehicle body. Therefore, the rigidity of the entire region in the vertical direction ranging from the left and right damper bases 50 and the upper parts of the left and right rear wheel houses 14 to the left and right rear pillars 13 can be improved.

An external force that is applied in a push-up direction from a road surface, that is, a road surface reaction force is transmitted the dampers Dp of left and right suspensions to the left and right damper bases 50. On the other hand, the left and right damper bases 50 and the upper parts of the left and right rear wheel houses 14 are sufficiently supported by the left and right rear pillars 13 through the left and right gussets 40. Therefore, the stress of the left and right damper bases 50 and the upper parts of the left and right rear wheel houses 14 generated by the road surface reaction force (damper input load) can be effectively reduced. Further, in order to improve the rigidity of the coupled structure, it is not necessary to add another reinforcing member. Therefore, the weight of the vehicle body can be suppressed as much as possible.

The left and right damper bases 50 are joined to the lower ends 44 of the left and right gussets 40 through the left and right rear wheel houses 14. Therefore, the damper input load transmitted from the left and right dampers Dp to the left and right damper bases 50 can be sufficiently supported by the left and right rear side frames 12 and the left and right rear pillars 13 through the left and right rear wheel houses 14 and the left and right gussets 40.

Figure 7:
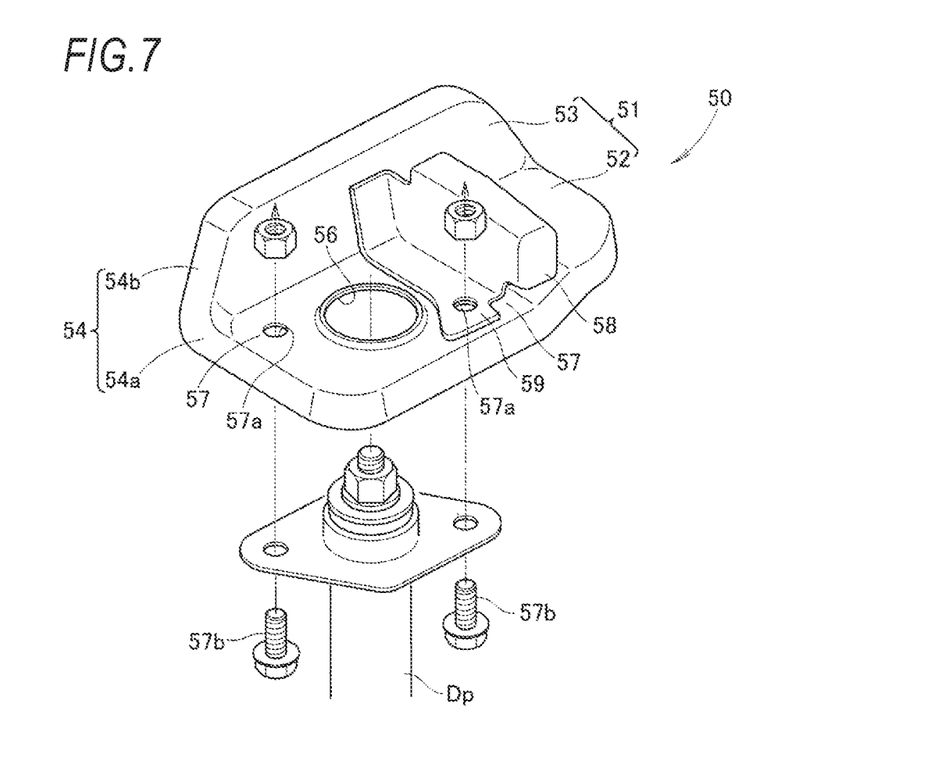
FIG. 7 is a perspective view of a damper base illustrated in FIG. 6.

As illustrated in FIGS. 4, 6, and 7, the left and right damper bases 50 include: substantially horizontal left and right damper attachment boards 51 to which the upper ends of the left and right dampers Dp are attached: and left and right bulkheads 58 that are provided in the left and right damper attachment boards 51. The left and right damper attachment boards 51 and the left and right bulkheads 58 are press-formed plate of a plate material.

The left and right damper attachment boards 51 are positioned at a distance below inner surfaces (lower surfaces) of the left and right top plates 37 of the left and right rear wheel houses 14. More specifically, the left and right damper attachment boards 51 are members that are formed in a substantially L-shape when seen from the vehicle rear direction, and include: substantially flat horizontal plates 52 that face lower surfaces of the left and right top plates 37; and vertical plate 53 that vertically extend from inner ends of the horizontal plates 52 in the vehicle width direction, respectively. In edges of the left and right damper attachment boards 51, left and right flanges 54 are formed over the entire area.

The left and right flanges 54 include: first flanges 54a that extend downward from peripheral edges of the horizontal plates 52; and second flanges 54b that extend outward in the vehicle width direction from peripheral edges of the vertical plates 53. The left and right flanges 54 overlap with and are joined to inner surfaces of the left and right rear wheel houses 14. As a result, the front plates 34, the rear plates 35, the back plate 36, and the top plates 37 of the left and right rear wheel houses 14 are combined with the horizontal plates 52 and the vertical plate 53 of the left and right damper attachment boards 51 in a box shape such that closed spaces 55 are formed in the box as described above.

The left horizontal plate 52 includes: one through hole 56 into which the upper end of the left damper Dp penetrates; and two fastening portions 57 and 57 for fastening the upper end of the left damper Dp. The right horizontal plate 52 has the same configuration as the left horizontal plate 52.

As illustrated in FIG. 7, the left two fastening portions 57 and 57 refer to portions of the left horizontal plate 52 where two bolt holes 57a and 57a are vertically formed. The upper end of the left damper Dp is attached to the left horizontal plate 52 by a bolt and a nut 57b and 57b that penetrate into the two bolt holes 57a and 57a.

As illustrated in FIGS. 4, 6, and 7, each of the left and right bulkheads 58 is positioned in at least one fastening portion 57 in each of the left and right damper attachment boards 51 or is positioned in the vicinity of the fastening portion 57. More specifically, the left and right bulkheads 58 are configured by ribs having a vertical plate shape, and are positioned on upper surfaces of the left and right horizontal plates 52. In edges of the left and right bulkheads 58, left and right flanges 59 having an L-shape in a back view are formed. The left and right flanges 59 are joined to the upper surfaces of the left and right horizontal plates 52 and inner surfaces of the left and right vertical plates 53 in the vehicle width direction. As a result, the left and right bulkheads 58 are joined to the left and right damper attachment boards 51.

The left and right closed spaces 55 surrounded by the left and right rear wheel houses 14 and the left and right damper bases 50 are partitioned in the front-and-rear direction of the vehicle body by the left and right bulkheads 58 (left and right vertical ribs 58). Therefore, due to the left and right bulkheads 58, the rigidity of the left and right damper attachment boards 51 in a board surface direction (vertical direction of the vehicle body) can be further improved. Accordingly, the left and right damper attachment boards 51 can sufficiently support the damper input load transmitted to the left and right dampers Dp.

Figure 8:
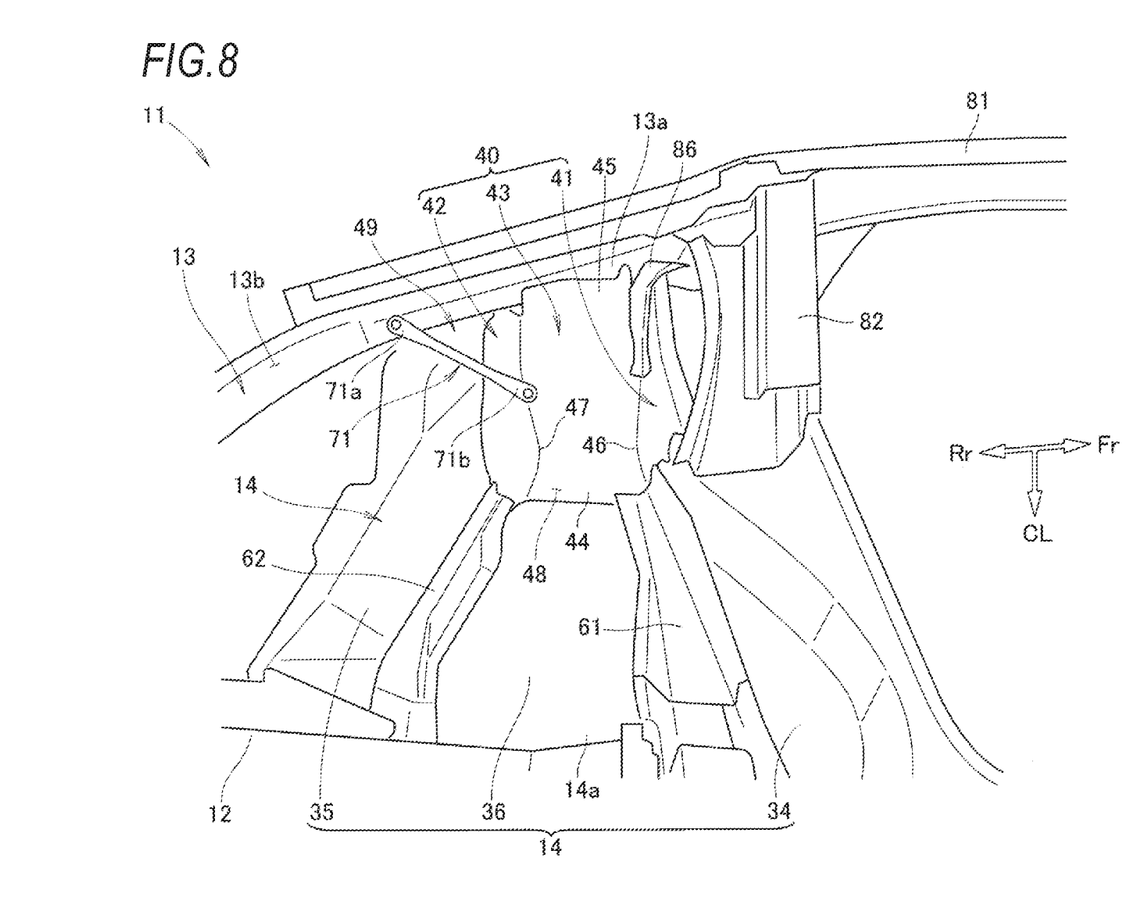
FIG. 8 is a perspective view of the left half of the vehicle rear body illustrated in FIG. 1 as seen from a center side and an upper side of the vehicle body.

As illustrated in FIGS. 5 and 8, front edges 38 and rear edges 39 of the left and right rear wheel houses 14 positioned inside in the vehicle width direction are formed in a square cross-section extending in the vertical direction, respectively. In addition, front edges 46 and rear edges 47 of the left and right gussets 40 positioned inside in the vehicle width direction are formed in a square cross-section extending in the vertical direction, respectively.

The left and right rear wheel houses 14 are reinforced by left and right front reinforcing members 61 and left and right rear reinforcing members 62 that extend upward from the left and right rear side frames 12. The left and right rear side frames 12 are coupled by a cross member 63 (see FIG. 1). The cross member 63 is also joined to lower ends of the left and right front reinforcing members 61.

The left and right front reinforcing members 61 are continuous to the front edges 46 of the left and right gussets 40 positioned inside in the vehicle width direction. The left and right rear reinforcing members 62 are continuous to the rear edges 47 of the left and right gussets 40 positioned inside in the vehicle width direction.

More specifically, the left and right front reinforcing members 61 and the left and right rear reinforcing members 62 are formed to have substantially L-shaped cross sections when seen from the top such that they can cover the left and rear front edges 38 and the left and right rear edges 39 of the left and right rear wheel houses 14.

The left and right front reinforcing members 61 overlap with and are joined to the left and right front edges 38 of the left and right rear wheel houses 14 from the inside in the vehicle width direction. Upper ends of the left and right front reinforcing members 61 are joined to lower ends of the left and right front edges 46 of the left and right gussets 40.

The left and right rear reinforcing members 62 overlap with and are joined to the left and right rear edges 39 of the left and right rear wheel houses 14 from the inside in the vehicle width direction. Upper ends of the left and right rear reinforcing members 62 are joined to lower ends of the left and right rear edges 47 of the left and right gussets 40.

The damper input load transmitted from the left and right dampers Dp to the left and right damper bases 50 are transmitted to the left and right rear side frames 12 and the left and right rear pillars 13 through the front edges 38 and the rear edge 39 of the left and right rear wheel houses 14, the front edges 46 and the rear edges 47 of the left and right gussets 40, and the left and right front reinforcing members 61 and the left and right rear reinforcing members 62. Therefore, the damper input load can be sufficiently supported by the left and right rear side frames 12 and the left and right rear pillars 13.

Figure 9:
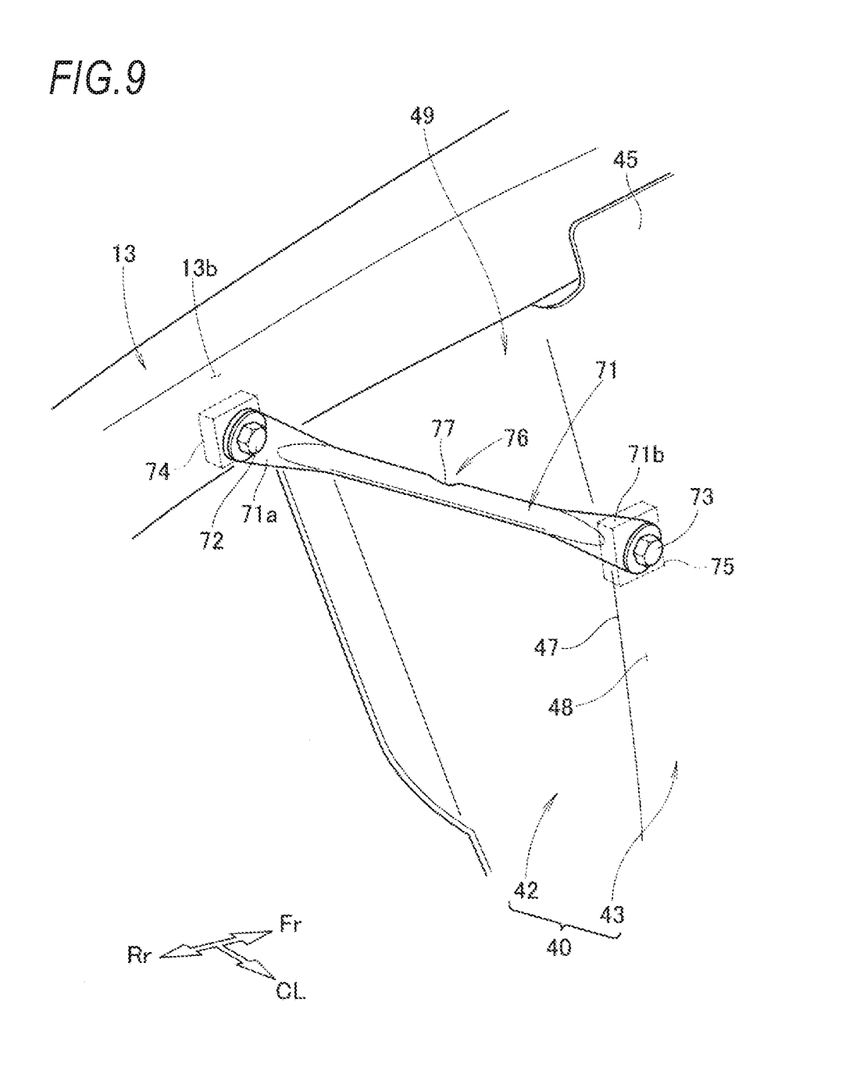
FIG. 9 is a perspective view of a brace illustrated in FIG. 8.

As illustrated in FIGS. 5, 8, and 9, in respective corners 49 in the front-and-rear direction of the vehicle body (for example, the rear side of the left and right gussets 40s) between inner surfaces 13b of the left and right rear pillars 13 in the vehicle width direction and inner surfaces 48 of the left and right gussets 40 in the vehicle width direction, left and right braces 71 are coupled by bolts 72, 73.

More specifically, the left brace 71 is configured by a pipe. Opposite ends 71a, 71b of the left brace 71 are formed in a flat shape. The end 71a of the left brace 71 overlap with the inner surface 13b of the left rear pillar 13 in the vehicle width direction and is attached thereto by the bolt 72. The end 71b of the left brace 71 overlap with the inner surface 48 of the left gusset 40 in the vehicle width direction and is attached thereto by the bolt 73. In the left rear pillar 13 and the left gusset 40, nuts 74, 75 for fastening the bolts 72, 73 are provided. Since the right brace 71 has the same configuration as the left brace 71, the description thereof will not be repeated.

The left and right braces 71 can function to brace the respective corners 49 between the left and right rear pillars 13 and the left and right gussets 40. That is, the inner surfaces 13b of the left and right rear pillars 13 in the vehicle width direction, the inner surfaces 48 of the left and right gussets 40 in the vehicle width direction, and the left and right braces 71 are combined to form a truss structure. Therefore, the bending moment generated from the left and right rear pillars 13 can be converted into a compressive load and can be effectively transmitted to the left and right gussets 40.

As illustrated in FIG. 9, in a part of the left and right braces 71 in the longitudinal direction, brittle portions 76 are provided, respectively. The brittle portions 76 are more brittler than other portions in the left and right braces 71. For example, the brittle portions 76 are configured by recess portions 77 are formed in a part of the left and right braces 71 in the longitudinal direction. In a case where an impact force is generated from the rear side in a rear end of the vehicle 10 (see FIG. 1), that is, in a case where a rear collision occurs in the vehicle 10, the left and right brittle portions 76 are plastically deformed such that they can absorb the collision energy.

Figure 10:
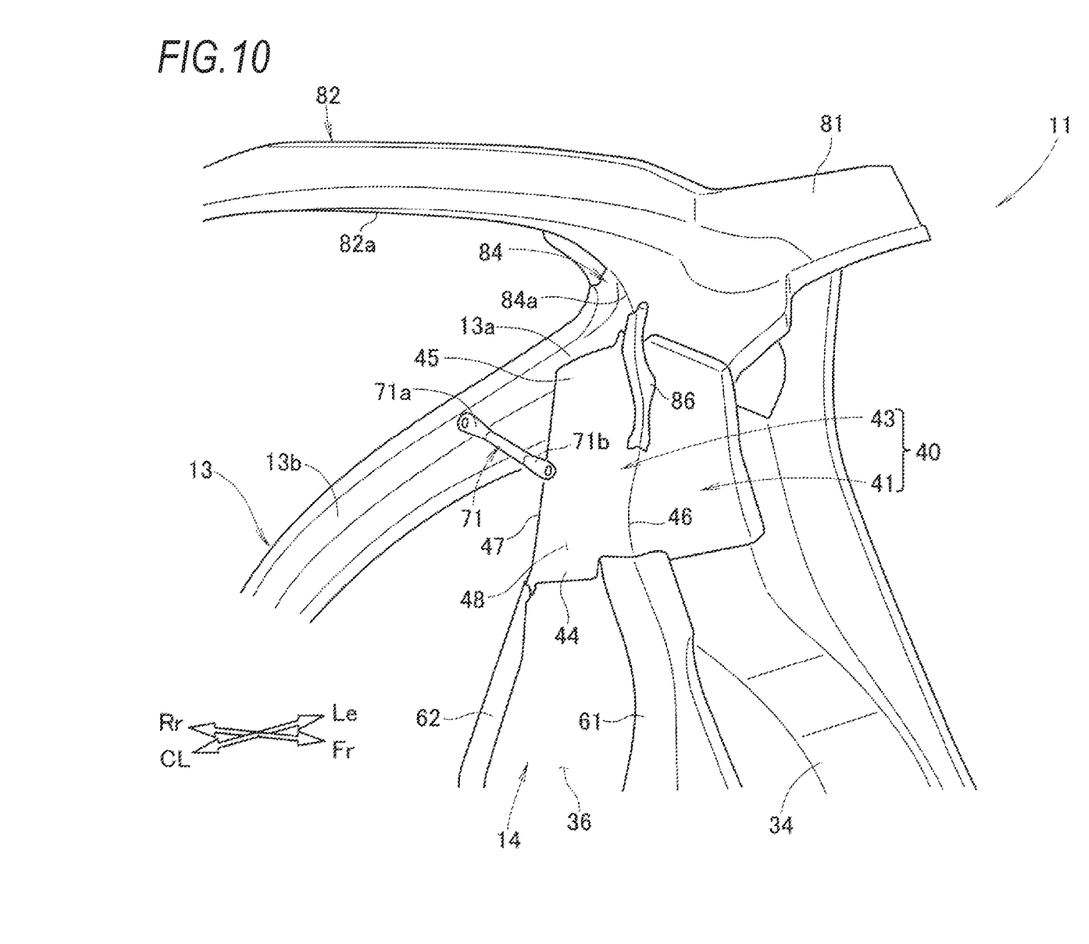
FIG. 10 is a perspective view of a front upper end of a left rear pillar, a roof arch, and a periphery of the left gusset illustrated in FIG. 1 as seen from a lower side in the interior of the vehicle.
Figure 11:
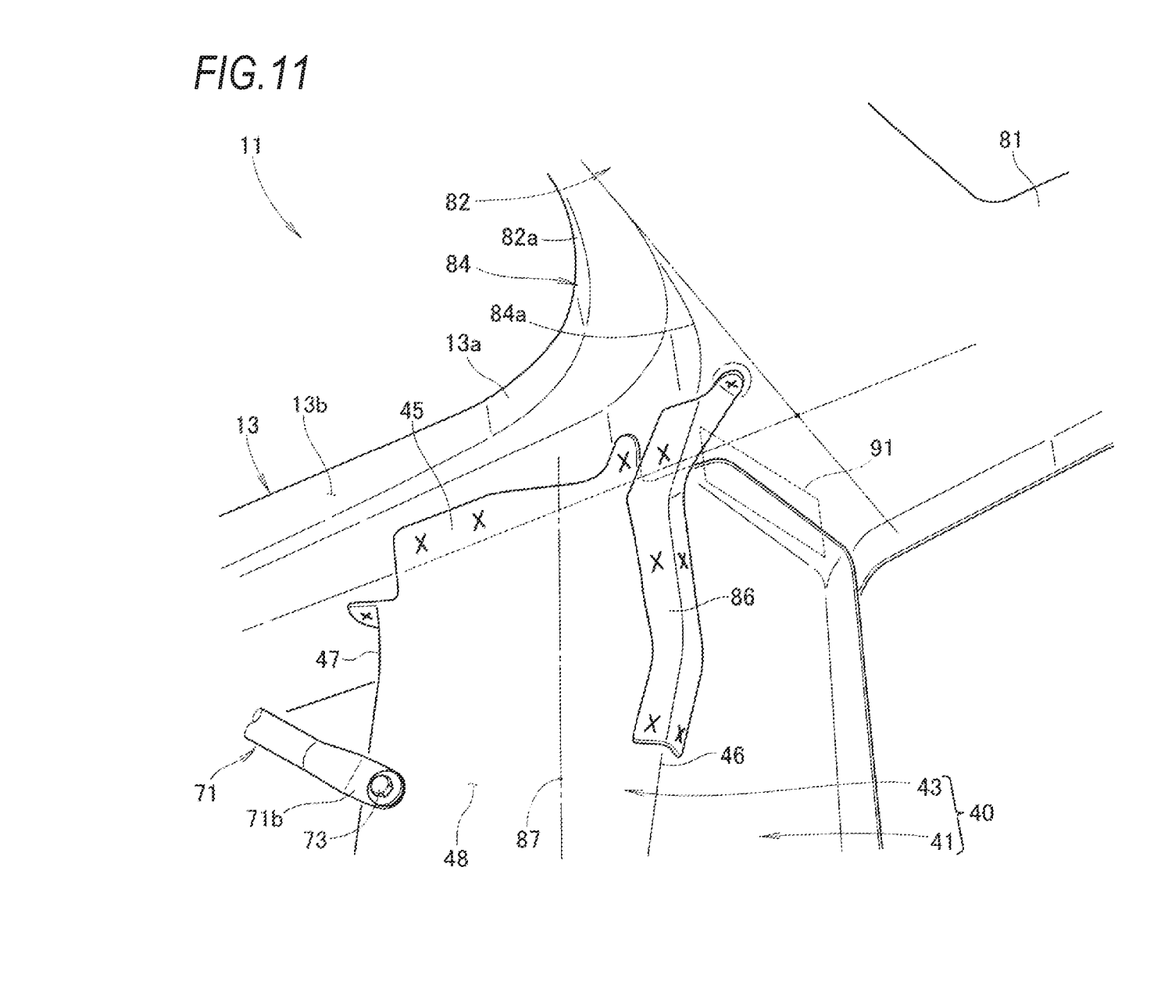
FIG. 11 is an enlarged view of the front upper end of the left rear pillar, the roof arch, and the periphery of the left gusset illustrated in FIG. 10.

As illustrated in FIGS. 3, 10, and 11, rear ends of left and right roof side rails 81 are joined to front upper ends 13a of the left and right rear pillars 13. The left and right roof side rails 81 extend from the front upper ends 13a of the left and right rear pillars 13 to the front of the vehicle body. A roof arch 82 is stretched between the front upper ends 13a of the left and right rear pillars 13 and is joined thereto. The left and right roof side rails 81 and the roof arch 82 can support a roof 83.

Left and right corners 84, which are positioned between the inner surfaces 13b of the front upper ends 13a of the left and right rear pillars 13 in the vehicle width direction and a rear surface 82a of the roof arch 82, are formed in a recessed arc shape when the vehicle body is seen from the top. Lower edges 84a of the left and right corners 84 are formed in a continuous square cross-section. As described above, the front edges 46 and the rear edges 47 of the left and right gussets 40 positioned inside in the vehicle width direction are formed in a square cross-section extending in the vertical direction, respectively.

As illustrated in FIGS. 5 and 11, left and right stiffeners 86 are positioned in the left and right corners 84. The left and right stiffeners 86 are formed to have substantially L-shaped cross sections such that either the left and right front edges 46 or the left and right rear edges 47 (for example, the left and right front edges 46) of the left and right gussets 40 overlap with and are joined to the lower edges 84a of the left and right corners 84. That is, the left and right front edges 46 of the left and right gussets 40 are coupled with the lower edges 84a of the left and right corners 84 through the left and right stiffeners 86 having a substantially L-shaped cross section.

Therefore, the rotation displacement of the left and right gussets 40 about a center axis 87 of the left and right gussets 40 in the vertical direction can be suppressed. Accordingly, the NV (noise vibration) performance of the vehicle body in a state where an engine (not illustrated) idles, that is, the so-called idle NV performance can be improved. As a result, in a state where the engine idles and the vehicle 10 is stopped, vibration (idling vibration) transmitted from the engine to the vehicle interior and felt by a passenger can be reduced.

Figure 12:
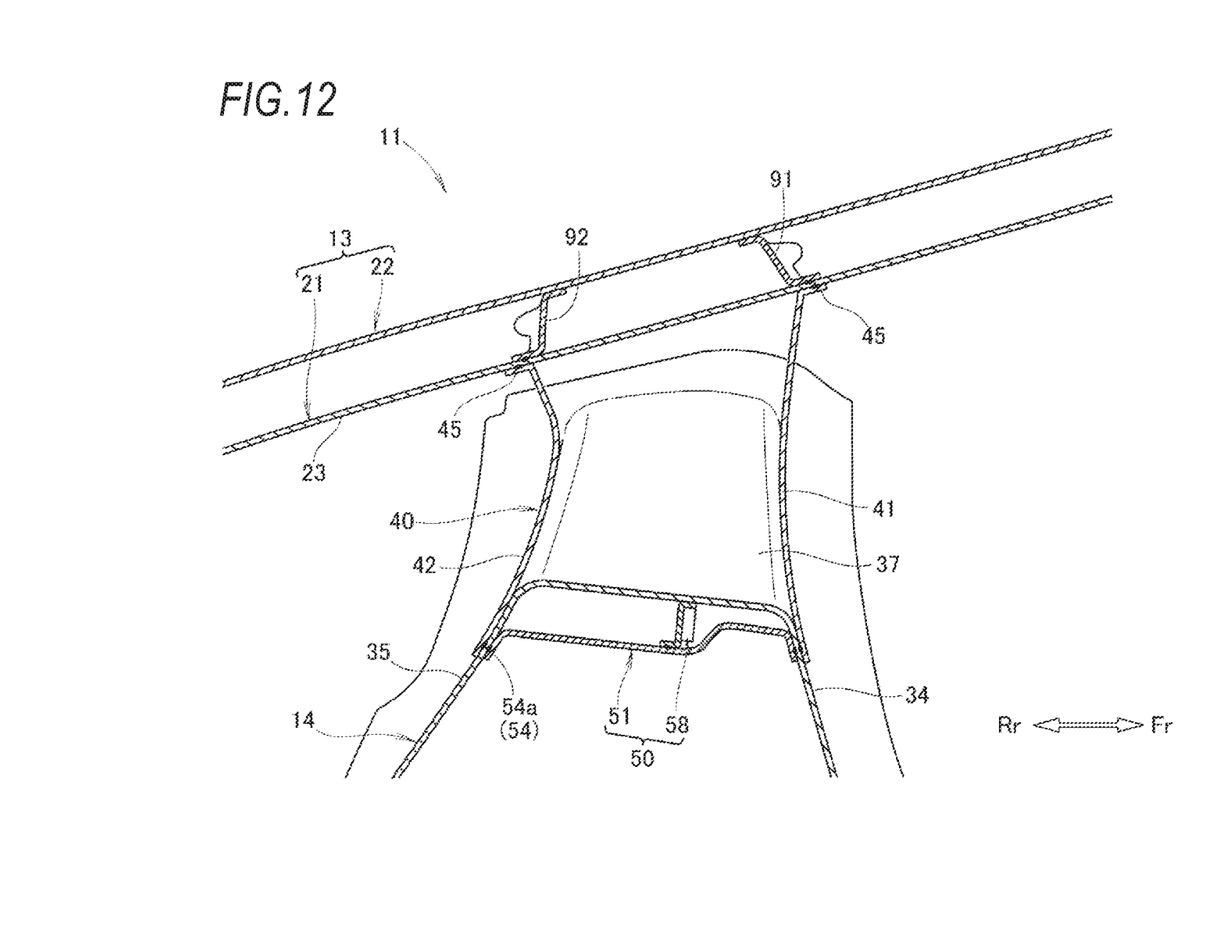
FIG. 12 is a sectional view taken along line 12-12 in FIG. 4.

As illustrated in FIGS. 3, 11, and 12, left two bulkheads 91 and 92 are provided in the left rear pillar 13. The two bulkheads 91 and 92 are joined to the left pillar inner panel 21 and the left pillar outer panel 22. The inside of the left rear pillar 13 is partitioned by the two left bulkheads 91 and 92 in the pillar longitudinal direction. One of the two left bulkheads 91 and 92 is the front bulkhead 91. The other one of the two left bulkheads 91 and 92 is the rear bulkhead 92. Since the right rear pillar has the same configuration as the left rear pillar 13, the description thereof will not be repeated.

The left and right front bulkheads 91 are positioned in upper ends of the edges 46 of the left and right gussets 40 on the roof arch 82 side, that is, upper ends of the front edges 46 (the upper ends of the front plates 41 of the left and right gussets 40), or are positioned in the vicinity of the upper ends. The upper ends of the front plates 41 of the left and right gussets 40 are joined to lower ends of the left and right front bulkheads 91 through the left and right pillar inner panels 21.

The left and right rear bulkheads 92 are positioned in upper ends of the left and right gussets 40 opposite to the edges 46 on the roof arch 82 side (the upper ends of the front plates 41 of the left and right gussets 40), or are positioned in the vicinity of the upper ends. The upper ends of the rear plates 42 of the left and right gussets 40 are joined to lower ends of the left and right rear bulkheads 92 through the left and right pillar inner panels 21.

The rigidity of intersections between the left and right rear pillars 13 and the left and right gussets 40 can be improved by the left and right bulkheads 91 and 92. As a result, the idle NV performance of the vehicle body can be improved. In addition, by providing the left and right bulkheads 91 and 92, the rigidity of joints between moving portions during idling vibration can be improved, and the vibration can be reduced.

The vehicle rear body structure of the present invention is suitable for adoption in passenger cars.

The present invention is not limited to the above-described embodiment, but may be appropriately modified or improved.

DESCRIPTION OF REFERENCE NUMERALS AND CHARACTERS 10 vehicle
11 vehicle body
12 rear side frame
13 rear pillar
13a front upper end
13b inner surface in vehicle width direction
14 rear wheel house
14a lower end
31 recess portion
34 front plate
35 rear plate
36 back plate
37 top plate
37a flange (upper end of rear wheel house)
38 front edge
39 rear edge
40 gusset
44 lower end
45 upper end
46 inner front edge in vehicle width direction
47 inner rear edge in vehicle width direction
48 inner surface in vehicle width direction
49 corner
50 damper base
51 damper attachment board
55 closed space
57 fastening portion
58 bulkhead
61 front reinforcing member
62 rear reinforcing member
71 brace
72 bolt
73 bolt
76 brittle portion
77 recess portion
82 roof arch
82a rear surface
83 roof
84 corner between front upper end of rear pillar and roof arch
84a lower edge
86 stiffener
87 center axis in vertical direction of gusset
Dp damper
Sp space provided between top plate and rear pillar

The invention claimed is:

1. A vehicle rear body structure comprising:
   left and right rear side frames that are positioned at a rear of a vehicle body and extend in a front-and-rear direction of the vehicle body;
   left and right rear pillars that extend forward and upward from rear lower ends of the left and right rear side frames;
   left and right rear wheel houses that are positioned between the left and right rear side frames and the left and right rear pillars and are recessed inward in a vehicle width direction; and
   left and right damper bases that are provided on upper parts of the left and right rear wheel houses, wherein
   lower ends of the left and right rear wheel houses are joined to the left and right rear side frames,
   left and right top plates of the left and right rear wheel houses are positioned immediately below the left and right rear pillars,
   the left and right rear pillars are joined to outer sides in the vehicle width direction of the upper ends of the left and right rear wheel houses,
   left and right spaces provided between the left and right top plates and the left and right rear pillars are closed by left and right gussets that have substantially U-shaped cross sections in a plan view and that have openings on outside in the vehicle width direction,
   lower ends of the left and right gussets are joined to the left and right rear wheel houses and upper ends of the left and right gussets are joined to the left and right rear pillars, so that the left and right rear pillars, the upper parts of the left and right rear wheel houses, and the left and right gussets are configured to be combined in closed cross-sections in a side view,
   the left and right damper bases are positioned inside the left and right rear wheel houses and are surrounded by the left and right gussets through the left and right rear wheel houses, and
   left and right braces are coupled in respective corners in front-and-rear direction of the vehicle body between inner surfaces of the left and right rear pillars in the vehicle width direction and inner surfaces of the left and right gussets in the vehicle width direction.

2. The vehicle rear body structure according to claim 1, wherein
   brittle portions are respectively provided in parts of the left and right braces in a longitudinal direction.

3. The vehicle rear body structure according to claim 1, wherein
   a roof arch is stretched between front upper ends of the left and right rear pillars to support a roof,
   left and right corners are formed in recessed arc shapes between inner surfaces of the front upper ends of the left and right rear pillars in the vehicle width direction and a rear surface of the roof arch, when the vehicle body is seen from the above,
   lower edges of the left and right corners are formed in continuous square cross-sections,
   front edges and rear edges of the left and right gussets positioned inside in the vehicle width direction are respectively formed in square cross-sections,
   left and right stiffeners are positioned in the left and right corners, and
   the left and right stiffeners are formed in substantially L-shaped cross sections such that the left and right stiffeners can overlap with and be joined to both the lower edges of the left and right corners and either the left and right front edges of the left and right gussets or the left and right rear edges of the left and right gussets.

4. The vehicle rear body structure according to claim 3, wherein
   left and right bulkheads are provided inside the left and right rear pillars, and
   the left and right bulkheads are positioned at upper ends of edges of the left and right gussets on a side of the roof arch or in a vicinity of the upper ends.

5. The vehicle rear body structure according to claim 1, wherein
   the left and right damper bases are configured by members other than the left and right rear wheel houses, and are positioned in recess portions of the left and right rear wheel houses that are recessed inward in the vehicle width direction,
   the left and right rear wheel houses and the left and right damper bases are combined in box shapes, and
   the left and right damper bases are joined to the lower ends of the left and right gussets through the left and right rear wheel houses.

6. The vehicle rear body structure according to claim 1, wherein
   the left and right damper bases includes: substantially flat left and right damper attachment boards to which upper ends of the left and right dampers are attached; and left and right bulkheads that are provided in the left and right attachment boards,
   the left and right damper attachment boards are positioned with a space below inner surfaces of top plates of the left and right rear wheel houses,
   the left and right bulkheads are positioned in fastening portions for fastening the upper ends of the left and right dampers in the left and right damper attachment boards or in a vicinity of the fastening portion, and extend from the left and right damper attachment boards to inner surfaces of the left and right top plates, and
   left and right closed spaces surrounded by the left and right rear wheel houses and the left and right damper bases are partitioned by the left and right bulkheads in the front-and-rear direction of the vehicle body.

* * * * *